United States Patent
Spain et al.

(10) Patent No.: US 8,009,575 B1
(45) Date of Patent: Aug. 30, 2011

(54) NETWORK CAPACITY FORECASTING AND MAINTENANCE

(75) Inventors: Derek Michael Spain, Olathe, KS (US); Shun Calvin Lai, Overland Park, KS (US); David Jason Gregory Butler, Kansas City, MO (US); Randall Lee Rezac, Baldwin City, KS (US); Paul Aaron Woelk, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1356 days.

(21) Appl. No.: 11/548,965

(22) Filed: Oct. 12, 2006

(51) Int. Cl.
*G01R 31/08* (2006.01)
(52) U.S. Cl. ........................ 370/252; 709/224
(58) Field of Classification Search .................. 370/252, 370/230; 709/224
See application file for complete search history.

(56) References Cited

U.S. PATENT DOCUMENTS

| | | | |
|---|---|---|---|
| 7,583,795 B1 * | 9/2009 | Florence et al. | 379/133 |
| 2001/0054097 A1 * | 12/2001 | Chafe | 709/224 |
| 2006/0209691 A1 * | 9/2006 | Boggs | 370/230 |

\* cited by examiner

*Primary Examiner* — Kevin C Harper
*Assistant Examiner* — Sai-Ming Chan

(57) ABSTRACT

Media, systems, and methods for ensuring adequate data-processing capacity in a communications network are provided. An embodiment of the method includes identifying a communications resource to evaluate, determine a maximum capacity that the resource is capable of handling, projecting a capacity-exhaustion timeline, wherein the timeline includes time estimations that are adjusted by an adjusting factor that is based at least in part on an accuracy of prior projection estimates. Determining a more accurate capacity exhaustion timeline allows for more accurate comparison against a time required to add such capacity. Recommends to effect capacity additions can be provided.

16 Claims, 5 Drawing Sheets

NETWORK CAPACITY FORECASTING AND MAINTENANCE

INTRODUCTION

Telecommunications networks include an array of resources. Various resources such as trunks and switches that connect to trunks have certain capacities of data that can be handled. If these capacities are exceeded beyond a threshold amount then problems can occur in the telecommunications network. For example, calls may be dropped, lost, or the overall integrity of the network may be compromised. Because a network cannot be upgraded instantaneously, a need exists to accurately forecast capacity demands of network resources so that the network can be upgraded with enough time so as to reduce the occurrence of errors associated with an over-burdened network.

SUMMARY

The presenting invention is defined by the claims below. The present invention has several practical applications in the technical arts including accurately determining future network-capacity needs so that data communications will not be interrupted.

In a first illustrative aspect, a method of ensuring adequate data-processing capacity in a communications network. The method includes identifying a communications trunk to evaluate, determining whether the trunk has roll-over capacity; and if the trunk does have roll-over capacity, then carrying out a first process to forecast a need to add processing capacity; but if the trunk does not have roll-over capacity, then carrying out a second process to forecast a need to add processing capacity. Both of the first and second processes can include projecting a date when current processing capacity will be exhausted based on an accuracy of prior projections.

In another aspect, a computer-implemented method includes identifying a communications resource to evaluate, determining a maximum capacity that the resource is capable of handling, and projecting a capacity-exhaustion timeline, wherein the timeline includes time estimations that are adjusted by an adjusting factor that is based at least in part on an accuracy of prior projection estimates.

In a final illustrative aspect, a computer-implemented method includes identifying a communications trunk to evaluate, determining a maximum capacity that the trunk is capable of handling, forecasting when current capacity will reach a maximum desired level by considering at least in part an accuracy of prior forecasting estimates, and presenting an action time frame that includes a consideration of a procurement time horizon associated with providing additional capacity.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| EO | End Office |
| GOS | Grade of Service |
| IDEN | Integrated Data Enhanced Network |
| NGVN | Next Generation Voice Networks |
| PBX | Private Branch Exchange |

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

Figure 1:
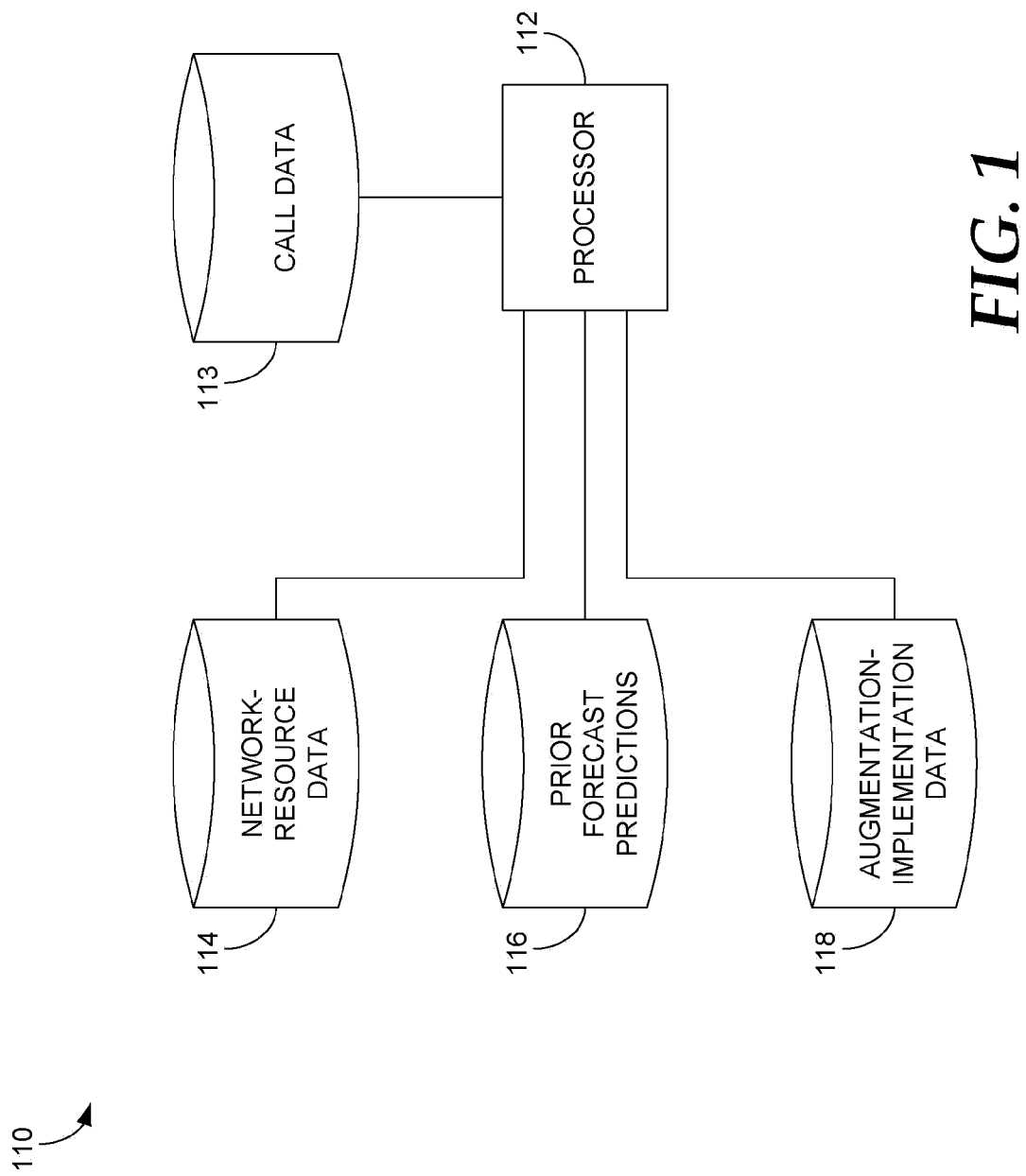
FIG. 1 depicts an illustrative operating environment suitable for practicing an embodiment of the present invention.

FIG. 1 depicts an illustrative operating environment suitable for practicing an embodiment of the present invention and is referenced generally by the numeral 110. By no means are all data sources that can be coupled to processor 112 shown. Call data 113 stores statistics and other information associated with routing data through a network. Illustrative metrics may include number of calls (or other data requests) offered to a resource, the number of requests satisfied, the type of data traffic handled, etc. The amount is vast.

Network-resource data 114 includes data that describes various types of network resources, characteristics of those resources, and how those resources are coupled to other resources. Prior forecast predictions 116 include predictions that were made in the past. This data is preserved so that it can be compared against actual results (capacities at certain time intervals), which can also be stored in database 116. Augmentation-implementation data 118 includes data associated with providing additional capacity to a network. For example, augmentation-implementation data 118 may include time horizons associated with installing new or replacing used equipment, regional pricing data, availability data, special-circumstances data that describe special measures that need to be taken, and any other details that might be useful to know in making a decision to augment a given resource.

Figure 2A:
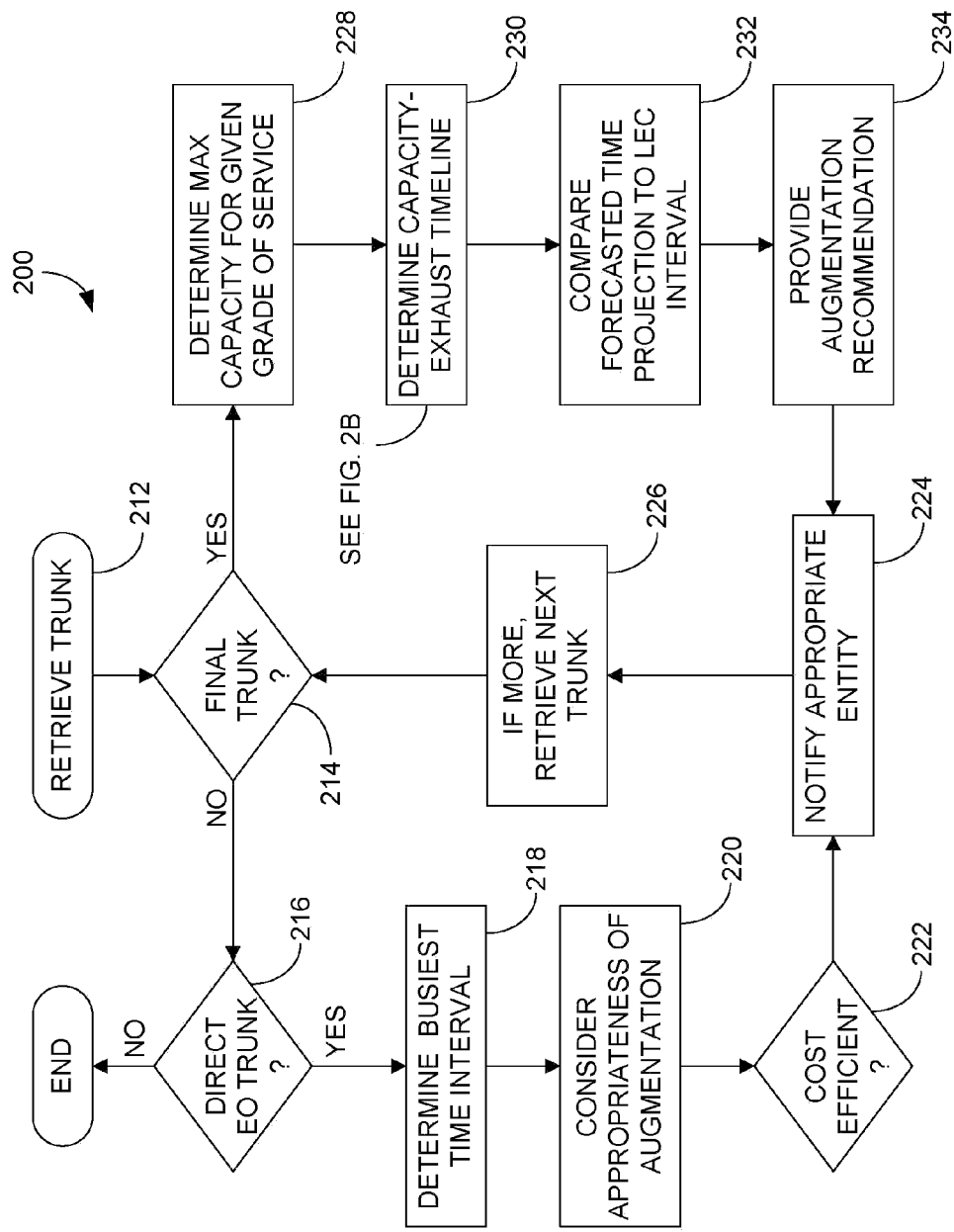
FIG. 2A is an illustrative method for practicing an embodiment of the present invention.

FIG. 2A depicts an illustrative method suitable for practicing an embodiment of the present invention and is referred to generally by the numeral 200. Of course not all steps shown in FIG. 2A are necessary. Some steps are shown to provide a better understanding of how an embodiment of the present invention would work. At a step 212, an indication of a trunk to be analyzed is received. A trunk is a communications line between two or more network-resource components. Illustrative network components include switches, switching systems, routing components, etc.

A switching system may include equipment in a central office (such as a telephone company). Generally, a trunk connects two switching systems. An end office (EO) is a type of central office to which a telephone subscriber is connected. The term "end office" is often used to refer to the last central office before a subscriber's phone equipment. It can also be referred to as the central office that actually delivers dial tone to a subscriber (including VOP—voice over packet—type systems, which are utilized in packet-based networks, and also including traffic associated with facilitating wireless communications).

A trunk or set of trunks facilitate the communication of data from a source device to a destination device. Trunks are generally rated for a certain capacity. That is, a trunk may be able to satisfy a certain capacity of data, after which little or no data will be able to pass through the trunk. One measurement used to measure capacity associated with trunks or their corresponding equipment is an "erlang." Capacity can be associated with a trunk or with the device to which it connects, such as a switch or switching equipment.

In a telecommunications network, switches and other routing components include tables that describe how information is to be routed throughout the network. Illustrative communication switches may be made by a variety of companies and are associated with a variety of technologies. For example, a first switch may be an IDEN switch, or an IDEN gateway switch, or an NGVN switch, and/or a switch manufactured by various manufacturers. These switches are generally coupled directly or indirectly to databases that record statistics and other information associated with the switches. For example, these databases may store usage information, routing information, and other traffic-related data. Other illustrative data may include switch assignments, wireless data, reference data, and the like.

After a trunk is identified at a step 212, a determination is made at a step 214 as to whether the trunk is a final trunk. A trunk is a final trunk if it is the last available trunk to handle data communications through the data communications line(s). Thus, if a trunk does not have any roll-over capability wherein a secondary device would otherwise be associated with the trunk to receive and handle data in the event that the trunk cannot handle such data, then that trunk would be a final trunk. In one embodiment, if the trunk is not a final trunk, then processing advances to a step 216, where a determination is made as to whether the trunk of step 212 is a direct end office trunk.

In the embodiment where check 216 is performed, if the trunk is not a direct EO trunk, then processing stops as no further determination needs to be made. But if the trunk is a direct end office trunk, or other type of trunk that would be appropriate for processing to continue, then processing advances to a step 218, wherein a busiest time interval is determined. Step 218 may also be referred to as determining utilization at the busiest time interval; that is, determining a time interval associated with a period of peak activity. For example, in one embodiment, the fruit of step 218 may be a determination of the busiest hour of the week (or some other desired interval, such as day, or even an hour or less).

In one embodiment, a busiest time interval may be determined by considering an amount of data processed against an available bandwidth while processing the data. As previously mentioned, call data can be stored in one or more data stores associated with a communications network, such as database 113. Such a database 113 can be queried to determine a certain number of calls that a piece of equipment was supposed to service, a number of calls that were blocked, and other traffic-related data over various time intervals. With this data available, the maximum utilization can be determined. This maximum utilization may be greater than 100%. This may be the case because the number of rollover calls can be taken into consideration.

In such a situation, if a switch was able to service a certain number of calls but also had to turn away a number of calls, then if those number of calls that are turned away are included in a calculation to determine a utilization value, then that value may be greater than 100%. For example, if a switch needed to turn away 40 out of 140 calls offered, then for a given time interval that those calls were received, the maximum utilization could be 140%. In some embodiments, it may be the case that a trunk or other network resource is not to be replaced until such a value exceeds a threshold percentage, such as 150% or 200%. This is the case because a direct EO trunk should rollover to another trunk until the rollover costs are greater than the cost for procuring additional facilities.

But at a step 220, a determination is made as to whether augmentation should be considered. This occurs by comparing the utilization ceiling with an actual maximum utilization. The utilization ceiling is a measurement or threshold set by a telecommunications company that indicates a highest tolerable capacity. This maximum tolerable utilization will be compared against an actual peak utilization to determine whether augmentation is appropriate. For example, if the maximum tolerable utilization is 175%, but an actual peak utilization is determined to only be 160%, then augmentation based on those metrics would not be desired. Of course, if the maximum tolerable utilization had been set lower than the peak utilization, then processing can at least continue to determine whether the trunk should be augmented. In such a situation, processing would advance to a determination step 222, wherein a determination is made as to whether augmenting the trunk would be cost-efficient. Thus, an embodiment of the present invention includes an automatic method for determining whether augmenting a network resource would be cost-efficient. This determination is made by comparing the cost of the procuring new facilities to the cost of the rollover calls.

For example, the present invention will be able to determine what type of resources will be necessary to augment the trunk, trunk group, or equipment associated with the communications pathway. In an embodiment of the present invention that includes a database of historical data that relates to prior implementation times and costs, a determination can be made as to the projected amount of time and cost associated with implementing at least a first level of augmentation. For example, a first level of augmentation may include doubling the resources that are currently available. But the present invention will also be able to consider the costs currently being incurred as a result of the applicable trunk not being able to service all of the data offered to it.

As previously mentioned, a trunk may not be able to service all of the data offered to it. In such a situation, data is rolled over to another communications line. In some situations, a telecommunications company may not own this other communications line, and there may be fees associated with having that data serviced by some other roll-over communications line. For example, a first company may own a first trunk group, and a second company may own a roll-over trunk group. The first company may need to pay fees to the second company every time data is rolled over from the first trunk group to the roll-over trunk group. Armed with this knowledge, a meaningful decision can be made as to whether it is cost-efficient to augment current resources or to just allow the status quo. In a situation where augmentation would cost less (perhaps over a certain time horizon) than the status quo, then an embodiment of the present invention will automatically recommend augmenting the current network without user intervention. In one embodiment, low-level details associated with augmenting current resources can be analyzed.

For example, prices may vary with geographical regions. A first switch may cost a first price to be implemented in a first geographical region but may cost a second price to be implemented in a second geographical region because of various factors. Illustrative factors include the cost of labor, the cost of availability of resources, and/or the costs associated with reaching a remote or other hard-to-reach location. An embodiment of the present invention can automatically, without user intervention, assimilate all such variables in making an informed recommendation as to whether augmentation should occur or not. This step is referenced by numeral 224, wherein an appropriate entity is notified. An appropriate entity may be a specific network engineer or another piece of equipment such that an alarm or automatic notification is directed appropriately so that the augmentation recommendation can be acted upon. At a step 226, provided more trunks exist to be examined, processing reverts to step 214 after a new trunk is identified to be examined.

Much of the processing steps described above were carried out in response to a determination that the trunk at issue was not a final trunk. But if a determination is made at step 214 that the trunk at issue is a final trunk, then processing advances to a step 228 to determine a maximum capacity for a given grade of service. A grade of service (GOS) is a benchmark indicator that indicates an acceptable number of errors associated with processing communications transactions. For example, it may be the case that 5 out of 1,000 transactions is the maximum number of transactions that can be associated with errors in a communications-processing environment. In such a case, the GOS may be referred to as 0.005. It may be the case that a trunk may have a greater capacity if more errors are tolerated.

Accordingly, a specific trunk will have a maximum capacity associated with a given GOS. An illustrative unit, among others, for capacity may be the erlang. For the purposes of this description, an erlang will be used as an illustrative unit of measure. An erlang is a unit of measurement of traffic density in a telecommunications system. Generally, an erlang describes the total traffic volume of one hour. For example, assume that in a given hour 60 calls occur. Each call lasts five minutes. In such a situation, the minutes of traffic in the hour will equal the number of calls times their duration, which would be 300 in this case (60×5). Accordingly, there would be 300 minutes of traffic in the hour. When this data is normalized to determine the hours of traffic in the hour, 300 is divided by 60 to reach a result of 5. Accordingly, the traffic figure for the above situation would correspond to 5 erlangs. Thus, at a step 228, a maximum capacity, given in erlangs, is determined based on a grade of service associated with a trunk.

Figure 2B:
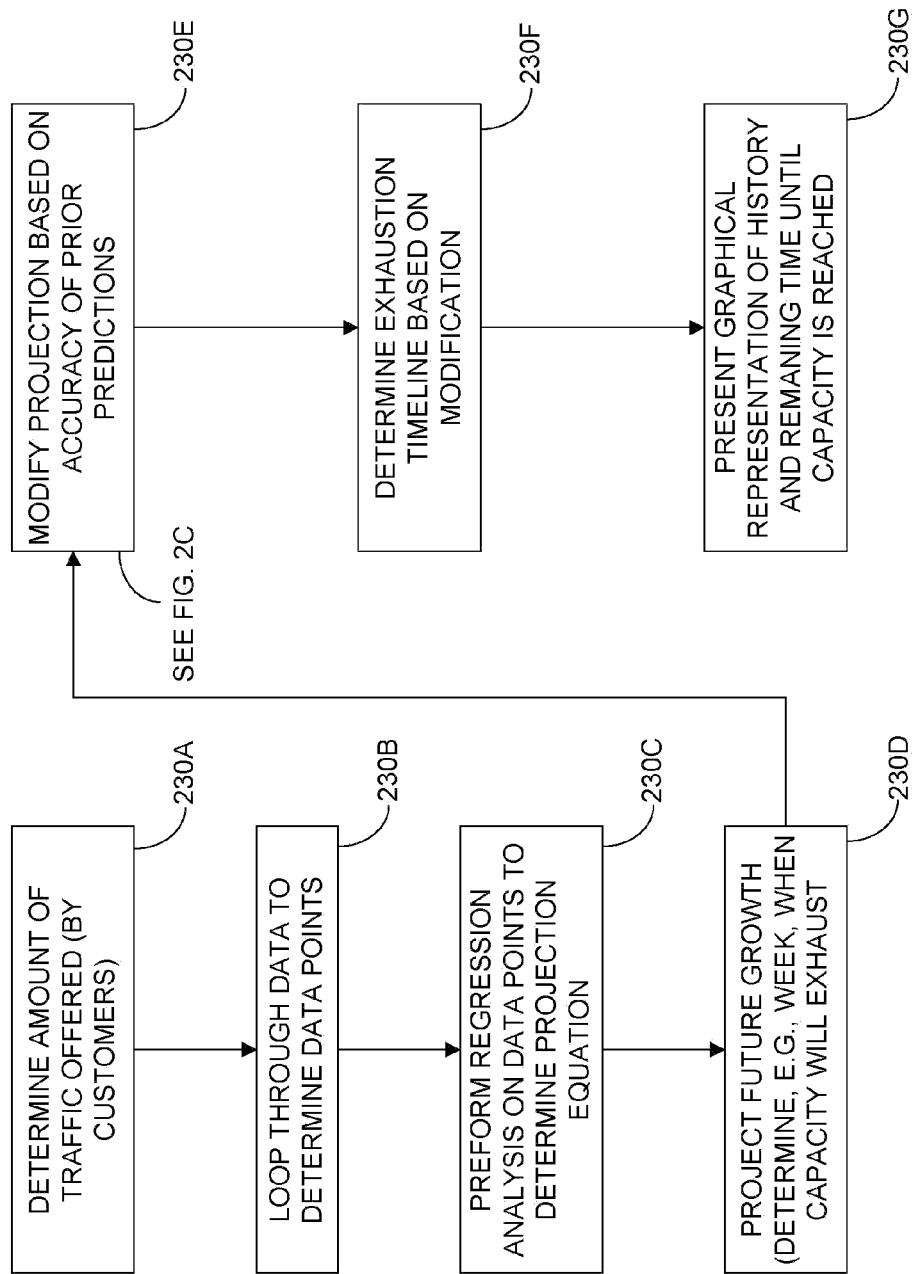
FIG. 2B depicts an illustrative process of determining a capacity-exhaustion timeline according to an embodiment of the present invention.

At a step 230, a capacity-exhaustion timeline is determined. A capacity-exhaustion timeline is a timeline that projects different levels of capacity over time. An illustrative process for determining a timeline that maps out projected capacity over time is provided in FIG. 2B. Turning now to FIG. 2B, a determination is made at a step 230A as to the amount of traffic offered, for example, by customers. "Offered" traffic refers to the amount of traffic that was at least initially to be handled by the trunk or trunk group or resource device. The "carried" amount refers to the amount of traffic that was actually handled by the trunk. Thus, capacity can be determined for various time intervals by considering the amount of offered traffic as well as the amount of traffic actually carried. Thus, at a step 230B, an embodiment of the present invention loops through as many data records or over as many time intervals as are desired to determine a set of data points, which are illustratively shown on FIG. 3 and referenced by numeral 312.

Figure 3:
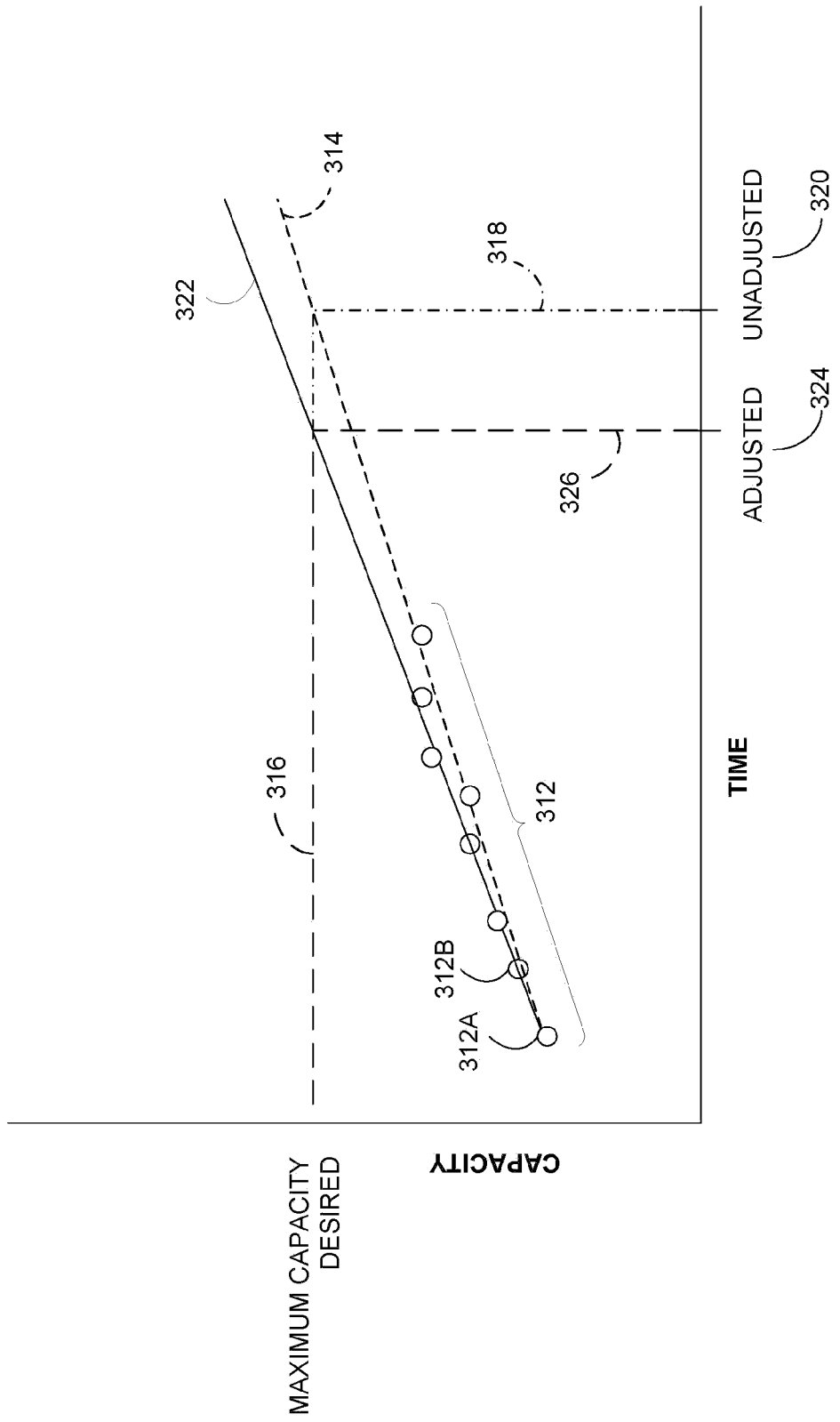
FIG. 3 depicts an illustrative graphical format for presenting exhaustion-horizon information, and also pictorially illustrates aspects of the invention to help facilitate understanding of an embodiment of the present invention.

We will make continuing reference to both FIG. 2B and FIG. 3 to help explain a portion of an embodiment of the present invention. Data points 312 are plotted on an axis where time is on the abscissa and capacity on the ordinate. Thus, each data point corresponds to a certain capacity over a certain time interval. For example, a given time interval may be weekly. In such a situation, each of the data points 312 corresponds to a maximum capacity for that week. Data point 312A may correspond to a maximum capacity for a certain week. Data point 312B may correspond to a maximum capacity of a different week, etc. As many data points can be generated as are desired.

At a step 230C, regression analysis is used to project an initial capacity timeline (230D), which is referenced as a dashed line by numeral 314. Line 314 reflects an initial, unadjusted timeline projection based on historical peak-capacity values over certain intervals of time. Thus, at a step 230D, future growth, such as the week in which a certain maximum capacity 316 would be reached can be calculated. In the example of FIG. 3, this would be indicated by line 318 which reflects an unadjusted projection of when capacity 316 would be reached.

But the present invention is not limited to merely projecting a capacity time-frame based on prior peak values. Although those can be an ingredient in the present invention, the present invention also includes the ability to adjust the initial projection 314 based on the accuracy of prior projections. Prior projection points are stored in an embodiment of the present invention. These prior projections are later evaluated against actual values to determine an adjustment factor, which can be applied to the initial projection 314 to arrive at an adjusted projection horizon 322. In the embodiment shown in FIG. 3, such an adjusted projection results in a steeper projection timeline 322. But it could be the case that prior predictions were inaccurate in such a way that the slope of initial projection line 314 should actually be lower, which would result in an adjusted projection line 322 less steep than initial projection line 314. By utilizing the adjusted timeline 322, a determination can be made based on the maximum capacity desired 316 that an adjusted timeframe 324 is more appropriate than an unadjusted amount 320. This data point would be reached by following line 326 down from the adjusted timeline 322.

In some embodiments, the adjustment factor is an average of the variances of prior projections from their actual values. For example, if the average prediction over the last 15 weeks was high by 3% on average, then an adjustment factor of 3% can be applied to the initial timeline 322 to compensate for an anticipated over-projection. This aspect of utilizing the accuracy, or, better stated, the inaccuracy, of prior projections to arrive at a more accurate projection of capacity exhaustion is a useful aspect of an embodiment of the present invention, which is summarily referenced by numeral 230E on FIG. 2B, and more particularly shown in FIG. 2C.

Figure 2C:
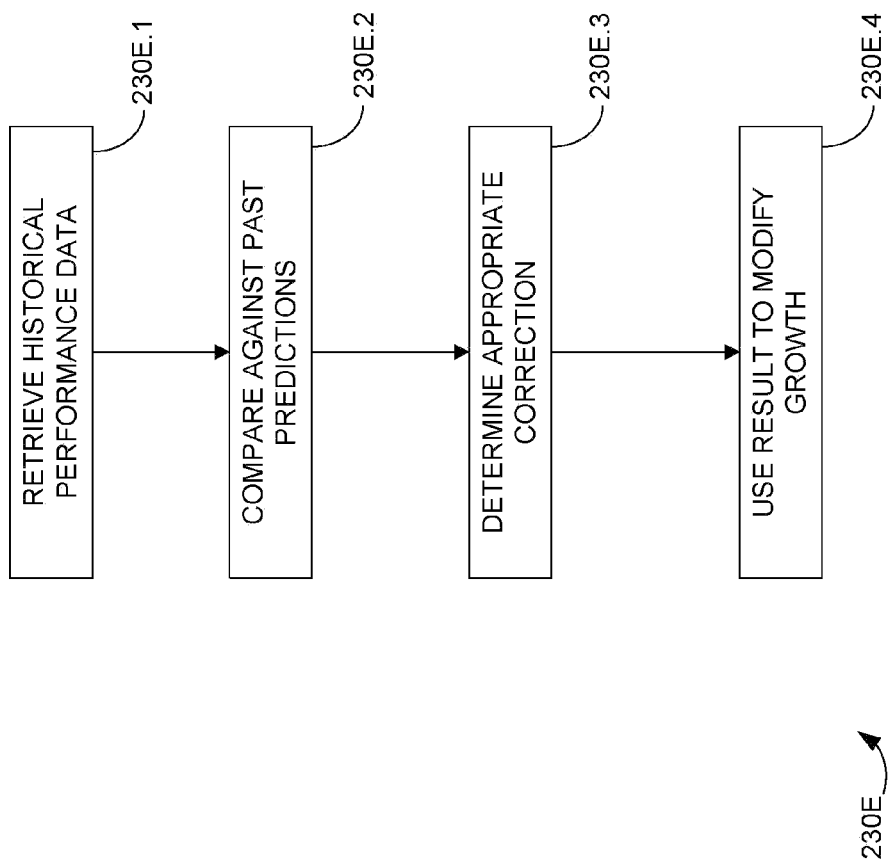
FIG. 2C depicts an illustrative method for modifying an initial projection based on an accuracy of past predictions.

Turning now to FIG. 2C, an illustrative process for modifying capacity predictions based on the accuracy of prior predictions is provided and generally referred to by the numeral 230E. At a step 230E.1, historical performance data is retrieved. At a step 230E.2, the historical performance data is compared against past predictions that correspond to the historical performance data. As previously mentioned, this data can be stored in various tables and be accessible for querying. At a step 230E.3, an appropriate correction factor is determined. Alternatively, initial projection 314 can be directly modified according to the correction determination of step 230E.3. As previously mentioned, one method of calculating an appropriate correction factor is to derive an average or weighted average of historical variances. In one embodiment, predictions that were made with more data may be given a different weight than predictions made with less data. In another embodiment, predictions that were made with data having a more consistent pattern may be given a different weight than predictions made with data having a less consistent pattern. Thus, at a step 230E.4, the results are used to modify the initial projection.

Returning to FIG. 2B, an exhaustion time-frame can be determined based on the modification at a step 230F. This value is referenced by numeral 324 in FIG. 3. At a step 230G, the results of the aforementioned analysis can be provided in graphical form. The graphical representation of the history and remaining time until capacity is reached can be displayed and presented to a user automatically without user intervention.

Returning to FIG. 2A, at a step 232, the forecasted time projection can be compared against the time necessary to augment the trunk. In one embodiment, a relevant time measurement may be a vendor interval. A vendor interval may be the interval of time necessary to upgrade resources associated with the vendor. In this aspect of the invention, much waste can be eliminated by comparing the amount of time it will take to actually augment a network by a desired amount with the amount of time until exhaustion will occur. In situations where the time-frames are close, a determination can be made to augment the network by a greater amount so that by the time the augmentations are actually implemented a desired amount of time will still exist before future augmentation will be necessary or desired.

An illustrative example is provided. Say the aforementioned analysis estimates that an 100% (or some other percentage if desired, such as 80%) capacity will be reached in 10 weeks given current capacity projections. In an embodiment of the present invention, historical data associated with implementation times for implementing upgrades will be referenced to determine a time-frame associated with implementing a proposed augmentation. Say that time-frame is 9 weeks. In such a case, if a recommendation was only made on the need to augment, then it could be the case that by the time an initial augmentation is implemented, only 1 week would remain until a new analysis would be appropriate. What is particularly relevant is what will be the capacity of the augmented network at the time that the augmentation is complete.

The present invention can calculate such a value and determine whether additional augmentation is appropriate. For example, the present invention could extrapolate the capacity of the given trunk or resource after the anticipated augmentation is implemented, and reproject a new time horizon for still another capacity time-frame. In situations where that subsequent time-frame is still sufficiently small, the initial augmentation recommendation can be supplemented or changed to reflect a more aggressive augmentation.

Based on the more aggressive augmentation, the analysis can be rerun, and still another projection timeline (such as 314 or 322) can be determined so that a new time-frame can be known that will correspond to the need for a subsequent augmentation after augmenting the network a first time. In this manner, resources can be conserved and not wasted. At a step 234, specific recommendations regarding augmentation will be automatically presented to a user. Thus, if 250% more capacity should be added such that adding that amount of capacity would forestall an additional augmentation in an additional year, such a recommendation can be presented to a user or other appropriate entity. As mentioned, a great deal of information about the network, historical data associated with implementing various devices, labor costs, construction costs, etc. can be linked to make such a recommendation without user intervention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. Computer-storage media having computer-useable instructions embodied thereon for facilitating a method of ensuring adequate data-processing capacity in a communications network, the method comprising:

identifying a plurality of communications trunks to evaluate;

determining whether a first communications trunk having roll-over capacity is a direct end-office trunk, and when it is, carrying out a first process to forecast a need to add processing capacity, wherein the first process includes:

(1) determining a maximum tolerable utilization for the first communications trunk, wherein the maximum tolerable utilization includes traffic that is acceptable to overflow from the first communications trunk, and wherein the first process accommodates a determined maximum tolerable utilization in excess of 100%, (2) determining an actual peak utilization for the first communications trunk based on an amount of utilization during a period of peak activity, (3) comparing the actual peak utilization with the maximum tolerable utilization, and (4) if the actual peak utilization exceeds the maximum tolerable utilization, then continuing to forecast the need to add processing capacity, but (5) if not, then stopping the forecast;

carrying out a second process for a second communications trunk having no roll-over capacity to forecast a need to add processing capacity, projecting a date for each of the first process and the second process when current processing capacity will be exhausted based on an accuracy of prior projections; and providing a notification to an appropriate entity of the projected first process date and the projected second process date.

2. The media of claim 1, wherein the first communications trunk and the second communications trunk each include one or more communications lines to be evaluated.

3. The media of claim 1, further comprising at least one secondary resource associated with the first communications trunk to handle transactions that were originally to be handled by the first communications trunk, in the event that the first communications trunk lacks capacity to handle the transactions.

4. The media of claim 3, wherein the at least one secondary resource includes an additional communications trunk.

5. The media of claim 1, wherein the actual peak utilization includes an amount of traffic that was actually not handled by the first communications trunk, and thus allowed to overflow during a peak time interval.

6. The media of claim 5, wherein the first process to forecast the need to add processing capacity includes performing a cost-efficiency analysis to determine a financial benefit associated with adding processing capacity.

7. The media of claim 6, wherein the cost-efficiency analysis includes weighing a first cost associated with augmenting the second communications trunk against a second cost associated with not augmenting the second communications trunk.

8. Computer-storage media having computer-useable instructions embodied thereon for facilitating a method of ensuring adequate data-processing capacity in a communications network, the method comprising:

identifying a plurality of communications trunks to evaluate;

determining whether a first communications trunk has roll-over capacity; and when the first communications trunk has roll-over capacity, then carrying out a first process for the first communications trunk having roll-over capacity to forecast a need to add processing capacity;

carrying out a second process for a second communications trunk which does not have roll-over capacity to forecast a need to add processing capacity, wherein the second process includes:

(1) determining a maximum capacity that the second communications trunk is capable of handling, wherein determining the maximum capacity includes determining a percentage of an actual maximum capacity, and (2) projecting a capacity-exhaustion timeline based on the determined maximum capacity;

projecting a date for each of the first communications trunk and the second communications trunk when current processing capacity will be exhausted based on an accuracy of prior projections; and providing a notification to an appropriate entity of the projected first process date and the projected second process date.

9. The media of claim 8, wherein the percentage of an actual maximum capacity is about 80% of the maximum capacity that the second communications trunk is capable of handling.

10. The media of claim 8, wherein projecting the capacity-exhaustion timeline includes determining a peak offered-traffic amount for a given time interval.

11. The media of claim 10, wherein projecting the capacity-exhaustion timeline further comprises repeating the step of determining a peak offered-traffic amount for a set of subsequent time intervals to accumulate a set of data points that indicate capacity over time.

12. The media of claim 11, wherein projecting the capacity-exhaustion timeline further comprises utilizing the set of data points to determine an initial timeline that indicates when the second communications trunk will reach a certain capacity.

13. The media of claim 12, wherein projecting the capacity-exhaustion timeline further comprises modifying the initial timeline by a factor that is based on an accuracy of prior capacity projections.

14. The media of claim 1, wherein at least said second process includes projecting a date when said current processing capacity will be exhausted based on growth of traffic handled by the second communications trunk and on said accuracy of prior projections.

15. Computer-storage media having computer-useable instructions embodied thereon for facilitating a method of ensuring adequate data-processing capacity in a communications network, the method comprising:

identifying a communications resource (resource) to evaluate;

determining a maximum capacity that the resource is capable of handling;

comparing prior capacity projections with historical performance data;

based on a result of the comparing, determining an adjustment factor that reflects an inaccuracy of the prior capacity projections;

projecting a capacity-exhaustion timeline, wherein the timeline includes time estimations that are adjusted by the adjustment factor; and providing a notification to an appropriate entity of the projected capacity-exhaustion timeline.

16. The media of claim 15, wherein the adjustment factor is an average of the variances of prior projections from the actual values.

* * * * *